United States Patent [19]
Wipasuramonton et al.

[11] Patent Number: 5,899,490
[45] Date of Patent: May 4, 1999

[54] METHOD OF FOLDING AN AIR BAG

[75] Inventors: Pongdet P. Wipasuramonton, Rochester; Michael J. Lachat, Shelby; Robert Tobian, New Baltimore, all of Mich.

[73] Assignee: Breed Automotive Technology, Inc., Lakeland, Fla.

[21] Appl. No.: 08/874,349

[22] Filed: Jun. 13, 1997

[51] Int. Cl.$^6$ .................................................. B60R 21/22
[52] U.S. Cl. ................................. 280/730.2; 280/743.1
[58] Field of Search ........................... 280/730.2, 730.1, 280/743.1

[56] References Cited

U.S. PATENT DOCUMENTS 5,348,342  9/1994  Haland et al. ...................... 280/730.2
5,570,900  11/1996  Brown ................................. 280/730.2

*Primary Examiner*—Kenneth R. Rice
*Attorney, Agent, or Firm*—Markell Seitzman

[57] ABSTRACT

An air bag (24) and method of folding an air bag (24) to protect an occupant during a side impact collision, the air bag being part of an air bag module (23) fitted within an outboard portion of a vehicle seat, the method including the step of folding the air bag (24) into a compact configuration such that when inflation gas is communicated into the air bag a resultant momentum vector, of the unfolding air bag sections, is directed forward of the seat and laterally away from a location of a seated occupant.

13 Claims, 4 Drawing Sheets

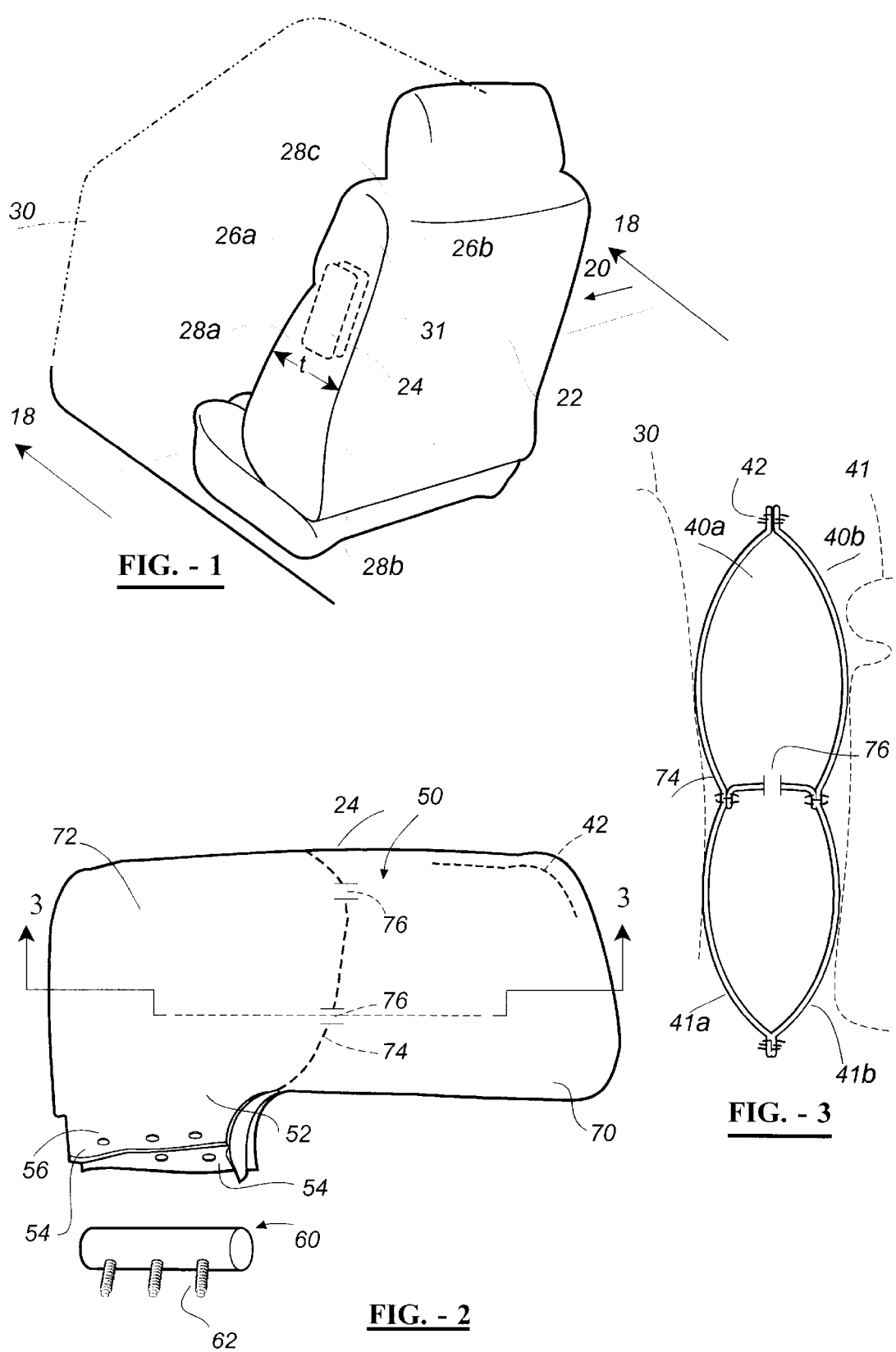

METHOD OF FOLDING AN AIR BAG

BACKGROUND AND SUMMARY OF THE INVENTION

The present invention generally relates to air bags and more particularly a method of folding an air bag used for side impact collision protection.

The way an air bag is folded, especially a side impact air bag (used to protect an occupant during a side impact or collision), provides an opportunity for controlling the air bag inflation dynamics including the direction and motion of the inflating air bag. As an air bag inflates it unfolds and various parts of the air bag are propelled outwardly, from its compact or folded condition. The air bag, however, does not immediately completely inflate. Typically, as an air bag inflates various still-folded parts are unfurled as a unit or mass. The mass of these partially unfolded parts, when accelerated during inflation by the inflation gas, may impact an occupant in a forceful manner. The present invention is directed to a method of folding an air bag such that when the air bag is inflated and unfolds, the air bag will avoid directly impacting the occupant especially the out-of-position occupant such as one seated too close to the side door of the vehicle. Most people, in this art, have defined the normally-seated occupant as one seated in the center of the seat, with the seat at its mid-range of fore-aft travel with the seat back at its designed angle. The out-of-position occupant is one that is seated in a position that deviates from the normally-seated position.

Most of the critical out-of-position injuries from side air bag inflation occur at an early stage of bag unfolding, that is, right after the air bag fully emerges from the seat. The proposed fold has shown significant improvement in out-of-position testing. The fold, of the present invention, encourages the partially unfolded parts of the air bag to swing away from the occupant, such that the resultant force vector of the inflating air bag is directed upward, and forward and laterally into adjacent vehicle structure such as a door or B-pillar. This desired motion of the unfolding of the leading edges of the air bag material (typically of a head chamber of the air bag) prevents a potential direct impact between an occupant body part by the relatively heavy and fast moving mass of air bag material thus avoiding injury to the occupant. As the cushion or air bag interacts with the lower torso of the occupant, the head portion of the cushion begins to fill reducing the loading effect that could be transferred to the occupant.

Accordingly the invention comprises an air bag and method of folding an air bag to protect an occupant during a side impact collision, the air bag being part of an air bag module fitted within an outboard portion of a vehicle seat, the method including the step of folding the air bag into a compact configuration such that when inflation gas is communicated into the air bag a resultant momentum vector, of the unfolding air bag sections, is directed forward of the seat and laterally away from a location of a seated occupant.

It is an object of the present invention to provide an improved method of folding an air bag.

Many other objects and purposes of the invention will be clear from the following detailed description of the drawings.

BRIEF DESCRIPTION OF THE DRAWINGS

In the drawings:

FIG. 1 diagrammatically illustrates a typical driver side automotive seat.

FIG. 2 illustrates a plan view of an air bag and inflator.

FIG. 3 illustrates a cross-sectional view through section line 3—3 in FIG. 2 of an inflated air bag.

DETAILED DESCRIPTION OF THE DRAWINGS

Figure 18:
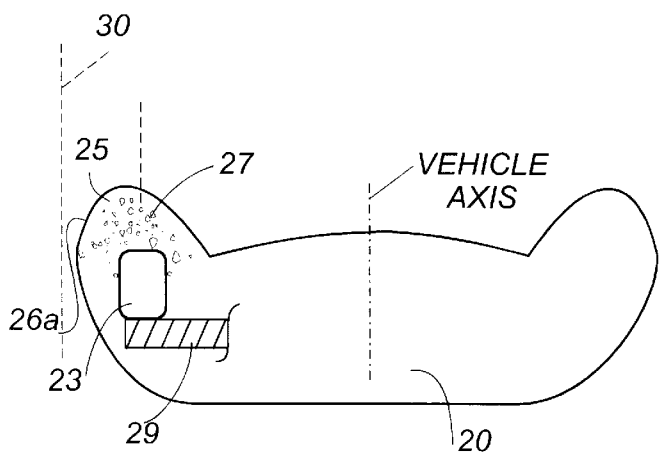
FIG. 18 is a cross-sectional view through section line 18—18 of FIG. 1 diagrammatically illustrating the mounting of an air bag module with the vehicle seat.

Reference is briefly made to FIG. 1 which diagrammatically illustrates a driver front seat generally designated as 20. The seat is also shown in cross-section in FIG. 18. Situated in the lower, middle of the seat back 22 is a side impact air bag module 23 typically comprising an inflator and side air bag. The back 22 of the seat 20 is typically constructed of various panels of covering material 28a,b,c joined at a plurality of seams such as 26a and 26b positioned above a foam layer 27 and includes a structural frame 29. As the air bag inflates, the air bag expands through the foam 27 and forcefully presses against the covering material panels 28a,b opening a seam such as 28a, creating a path through which the air bag continues to inflate. In other installations the air bag module includes a separate deployment door situated on the side 31 of the seat back 22 which is opened as the air bag inflates. When inflated, the air bag will be positioned between the side of the vehicle, typically along the inside of the door or B-pillar, generally shown by phantom line 30 and the side of the adjacent occupant. As can be seen from FIG. 1 a typical seat back 22 has a cross-section that is generally trapezoidally (tapered) shaped, that is, the thickness, t, of the back is wider near the lower portion of the back and narrower near the top of the seat. As can be appreciated, if the external shape of the air bag module 23 conforms to the shape of the seat back it may make the installation of the air bag module (within the seat) easier. The air bag module, comprising the inflator and air bag (and if needed a retainer or housing and cover) are typically secured to a structural member (frame) 29 within the seat in a known manner (see FIG. 18).

Reference is now made to FIG. 2 which illustrates the side impact air bag 24 of the present invention. The air bag is constructed of two similar pieces of typically woven fabric such as 40a,b which are sewn together about the peripheral seam 42. Side impact air bag fabric has a low air flow permeability or is coated with silicon to prevent the inflation gas from flowing through the pores of the material. This construction permits the air bag to remain inflated for a longer period than if a higher permeability fabric is used. The bag includes a cushion portion generally designated as 50 and a neck or inlet portion 52. The cushion 50 is generally rectangular in shape. The neck portion includes two flaps 54, one formed on each piece or panel of material 40a,b. Each flap 54 includes a plurality of mounting holes 56. As has been used in the prior art, an inflator (or inflator retainer and/or manifold), generally shown as numeral 60, comprising a plurality of mounting studs 62 is inserted within the neck portion 52 of the air bag and the two opposing flaps 54 are positioned in overlapping relation about the inflator such that the mounting studs 62 fit through each of the sets of openings 56 in the two flaps. The cushion portion 50 of the air bag 24 may be divided into an upper or head cushion 70 and a lower or thorax cushion 72 divided by a separator 74 having one or more inflation gas vent control openings 76 therein which control the rate at which inflation gas is communicated from the thorax portion 72 into the head portion 70. The separator 74, made from air bag material, is sewn to the adjacent panels of material 40*a,b*. When the bag is inflated it will be vertically oriented within the vehicle with the thorax portion between the vehicle door and the thorax of the occupant 41 and the head portion extending upwardly from the thorax portion between the vehicle door and the occupant's head and (outside) shoulder (see FIG. 3).

Figure 4:
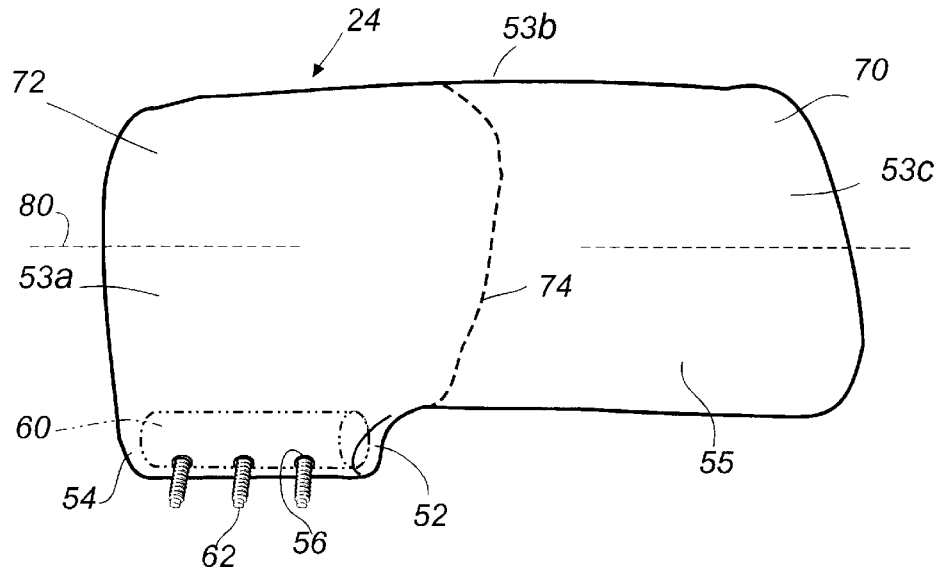
FIGS. 4–10 illustrate various steps in the folding process.

FIG. 4 illustrates the air bag 24 laid upon a flat surface (and horizontally oriented) with the inflator 60 inserted within the neck portion 52 with its studs 62 extending through the corresponding openings 56 in the overlapping flaps 54.

Figure 5:
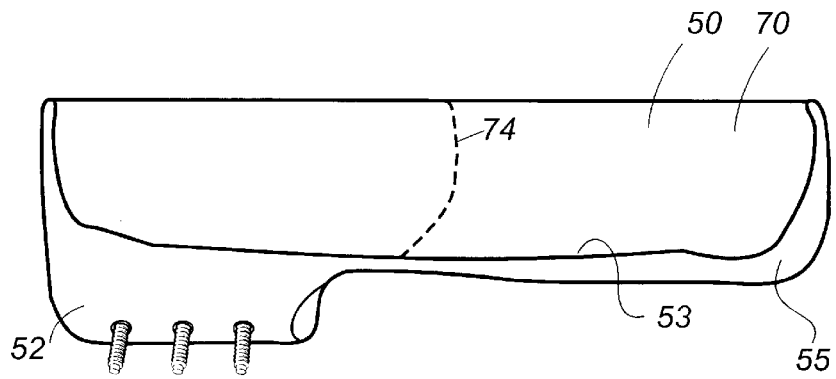
Figure 6:
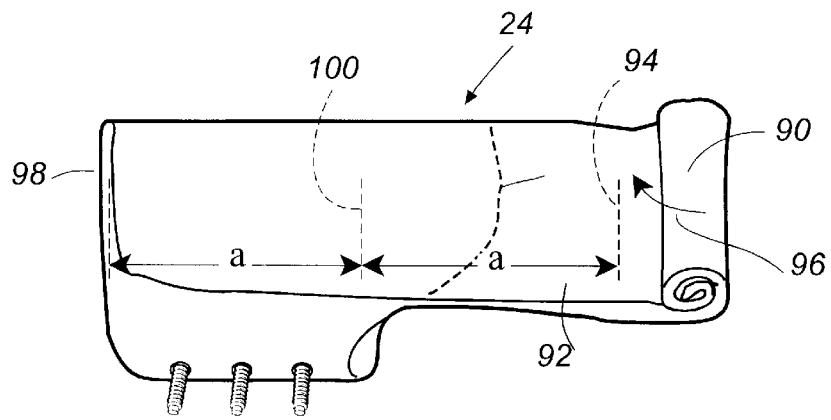
Figure 7:
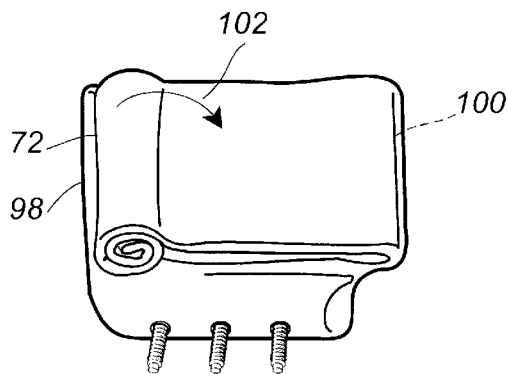
Figure 8:
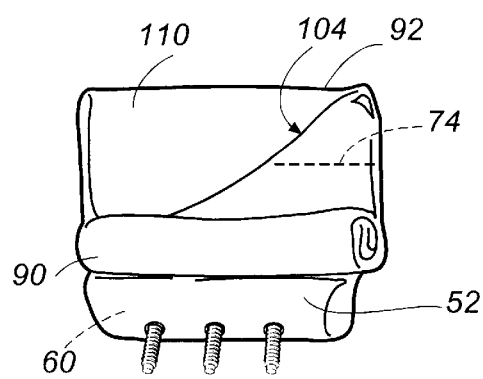
Figure 9:
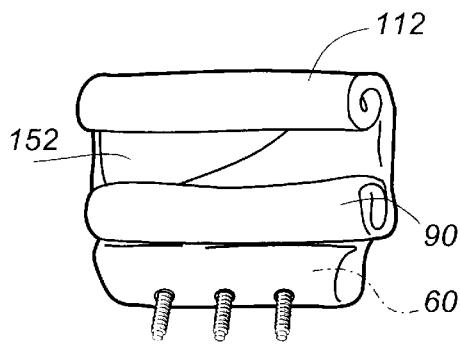
Figure 10:
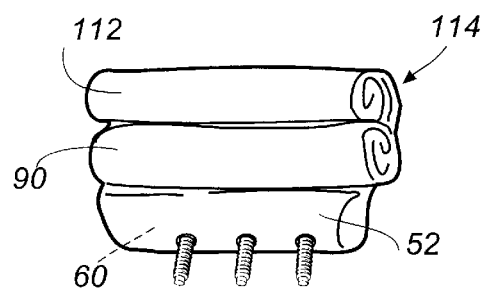
Figure 11:
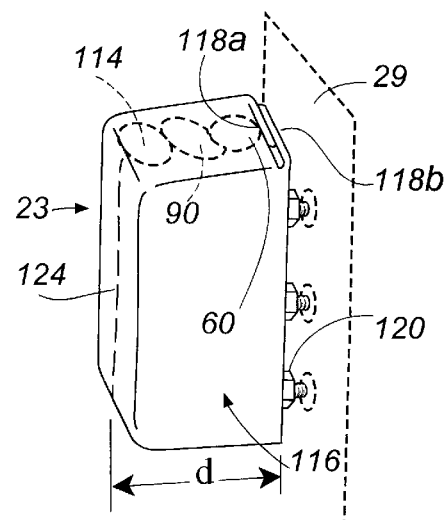
FIG. 11 shows a side impact air bag module including a cover secured about the air bag and inflator.

The following steps describe how to fold an air bag that will be installed in the outboard wing 25 (see FIGS. 1 and 18) of a driver's vehicle seat. The method of folding a passenger side air bag is the mirror image of those steps described below starting with the air bag of FIG. 4 rotated 180 degrees (about a vertical axis). The first step in the folding of the air bag 24 is to fold the cushion portion 50 generally in half along a horizontal first fold line designated by phantom line 80. The fold line is generally parallel to the orientation (axis) of the inflator 60 and the angle of the inlet or neck 52. The folded configuration is shown in FIG. 5 wherein the forward (in relation to its orientation in the vehicle) side edge portion 53*b* of the cushion has been folded over an adjacent, lower portion 55. The next step in the folding process is to form the head cushion 70 into a roll or rolled portion 90. This is accomplished by tightly rolling the head portion 70 of the air bag 24 towards the thorax portion forming a compact, roll 90 of cylindrical shape. As can be seen in FIG. 6, the head portion 70 of the bag is rolled toward the folded-over thorax portion 72 until the rolled portion 90 reaches a dimension equal to 2*a* wherein *a* is equal to the length of the neck 52. In subsequent process steps the rolled portion 90 is rotated 90 degrees forming a pleat in the air bag material and positioned adjacent and parallel to the location of the inflator 60. This configuration can be accomplished as follows: with the rolled portion 90 positioned along line 94 (at a distance 2*a* from end 98), the rolled portion 90 and adjacent material 92 are moved (see arrow 96) to the opposite end 98 (of the folded configuration of FIG. 6). The material 92 which was adjacent the roll 90 is folded over along fold line 100 (at dimension "*a*") permitting the roll or rolled portion 90 to be placed generally along the end 98 and oriented perpendicular to the orientation of the inflator 60. This configuration is shown in FIG. 7. Thereafter, the roll 90 is rotated outwardly and then down approximately 90 degrees forming a pleat 104 (which as illustrated will be oriented at about 45 degrees) in the adjacent material 92. In this configuration, shown in FIG. 8, the roll 90 is positioned atop the material near the neck 52. Thereafter the extending portion of material of the partially folded air bag designated by numeral 110, which is opposite the location of the neck 52, inflator 60 and first roll 90, is formed into a second, tightly formed second roll 112 which is rolled toward (see FIG. 9) and positioned adjacent the first roll 90 forming a generally rectangular package shown in FIG. 10. As can be seen, the two rolls 90 and 112 form adjacent cylinders next to the generally cylindrical shape of the neck portion 52 of the air bag (in which the inflator 60 is located). Subsequently the folded air bag 114 of FIG. 10 is enclosed within a protective, typically plastic, covering 116. The covering 116 which may be a somewhat rigid plastic to prevent damage of the air bag when installed in the seat, may also include a plurality of flaps 118*a,b* similar in function to those flaps 54 of the air bag 24 wherein the flaps are positioned in overlapping relation with the studs 62 extending through openings therein. The flaps 118*a,b* of the covering 116 are secured to the studs by a plurality of fasteners such as nuts 120. An end portion 122 of the covering 116 opposite the location of the inflator 60 may include a plurality of perforations which act as a tear seam 124, facilitating the ease by which the covering 116 is opened as the air bag 24 inflates. FIG. 11 shows the air bag module comprising the air bag 24, inflator 60 and covering 116 in a vertical orientation attached to a seat frame 29. The air bag module may be attached directly to the frame with the studs 62 received within corresponding mounting holes therein or attached to a separate bracket (not shown).

Figure 12:
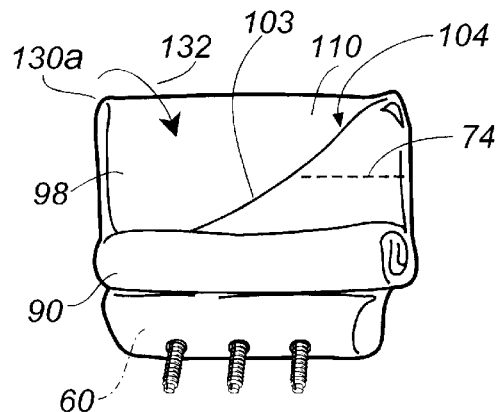
FIGS. 12–15 illustrate an alternate folding technique.
Figure 13:
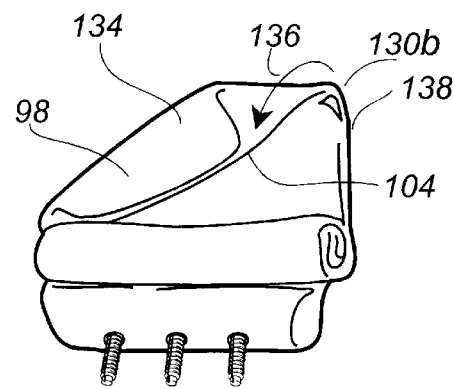
Figure 14:
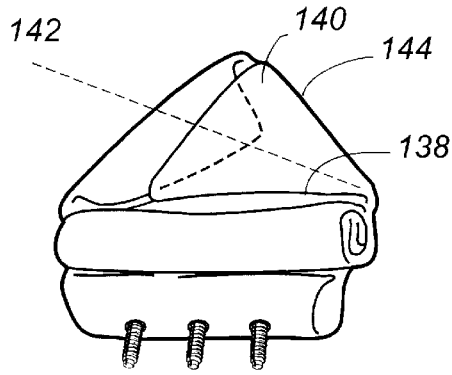
Figure 15:
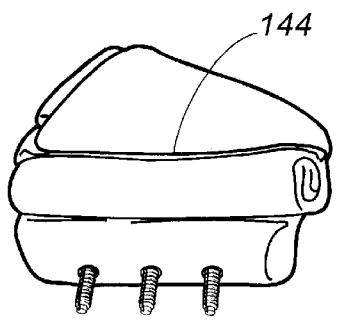
Figure 16:
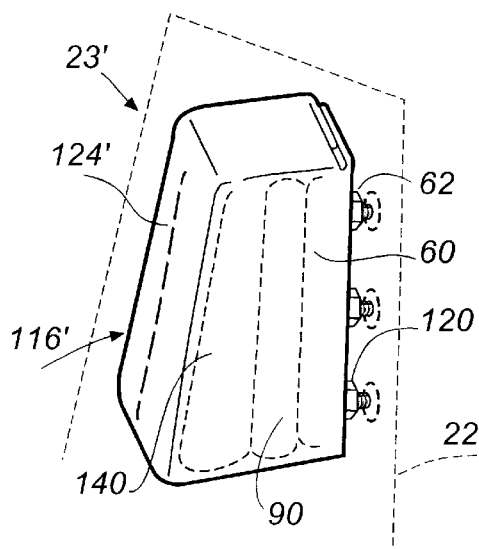
FIG. 16 shows an alternate air bag module configuration.

Reference is briefly made to FIGS. 12–15 which illustrate an alternate embodiment of the invention. FIG. 12 is identical to FIG. 8. Having completed the method steps to achieve the partially folded orientation illustrated in FIG. 12 (FIG. 8), the top left corner 130*a* of the partially folded air bag is folded inwardly (see arrow 132) with end 98 placed adjacent the edge 103 of pleat 104 forming a triangular fold 134. The top right corner 130*b* is subsequently folded inwardly (see arrow 136) forming a fold 140, so that edge 138 is positioned adjacent a side of the roll 90. Subsequently, the fold 140 (as well as part fold 134) is folded over along an angled fold line 142 so that edge 144 (of fold 140) is positioned adjacent the roll 90 giving the folded air bag a generally trapezoidal (tapered) configuration. As mentioned above, the side profile of many seats is tapered. If for example, the depth, d, (see FIG. 11) of this type of folded configuration is too long it will be difficult to fit (this rectangularly shaped module) within the tapered profile of the seat at the designed location. The tapered or trapezoidal shape of the module 23' configuration achieved in FIG. 16 provides a greater degree flexibility in positioning the side impact air bag assembly or module 23' within the tapered cross-section of the seat back 22. FIG. 16 illustrates a tapered covering 116', having a tear seam 124' to protectively enclose the folded air bag. FIG. 16 shows the covering 116' in a vertical orientation which is typical of its installation within the seat back 22 of a seat 20.

Figure 17:
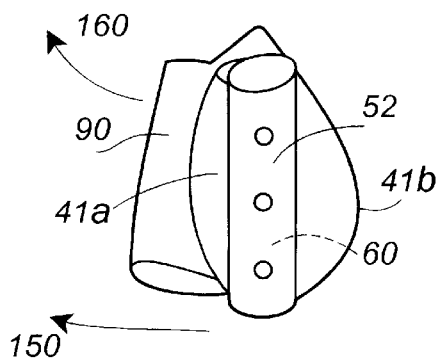
FIG. 17 shows the air bag during the initial moments of inflation.

The following describes the way the air bag 24 of FIGS. 1–11 inflates. In the event of an accident, the inflator 60 is provided with an activation signal from a sensor and control unit of known design. The inflator 60 provides inflation gas into the neck 52 of the folded air bag 24 which first inflates the material in the lower portions 41*a,b* of the panels 40*a,b* causing them to balloon as illustrated in FIG. 17. This initial action occurs with the air bag still within the seat and urges the lower end of roll 90 outwardly (see arrow 150) in the adjacent seat foam and covering material. Simultaneously, the inflation gas is communicated to the folded over portion of the air bag 152 (see FIG. 9) (which is part of the second roll 112) urging this folded portion 152 and the second roll 112 forward against the seat foam and covering material. As can be appreciated the resulting initial force vector of the inflating air bag (in relation to the driver seat) is forward and to the left (and up) into the adjacent vehicle structure. Within a few milli-seconds the air bag 24 emerges from the wing 25 of the seat 20 either after it breaks through a seam 26*a* or opens a closely positioned deployment door. The bag, being free of the confines of the seat, and having its momentum in the direction of the initial force vector 160, rapidly inflates with the inflation gas filling the pleat 104 and the first roll 90 lifting the pleat up and further rotating the first roll 90 toward the vehicle door (away from the wing 25 of the seat 20) and forward of the seat (and seated occupant) to avoid a direct contact with the occupant. The bag 24, as it inflates uses the relatively stiff frame 29 (see FIG. 18) as a reaction surface as it moves outwardly relative to the seated occupant. As more inflation gas enters the cushion 50 the lower or thorax portion 72 of the bag 24 inflates and due to the momentum of the unfolding portions of the air bag is pushed against the vehicle door (or B-pillar) to transfer most of its kinetic energy to the vehicle structure lessening the energy impact with the occupant. The inflation gas continues to fill the thorax portion, flows through the vent control opening 76 (if used) into the head portion 70 to unfold (or unroll) the roll 90 to completely fill the air bag. The air bag 24 of FIG. 12–16 will fill and unroll in a similar manner. The first roll 90 is initially urged outwardly, and the fold 143 pushed forward defining the initial momentum vector. Thereafter the bag breaks from the seat and continues to inflate with the gas entering folds 136 and 140 and lifting and rotating the roll 90 into the vehicle structure. Thereafter, inflation continues as described above.

Many changes and modifications in the above described embodiment of the invention can, of course, be carried out without departing from the scope thereof. Accordingly, that scope is intended to be limited only by the scope of the appended claims.

We claim:

1. A method of folding an air bag (24) to protect an occupant during a side impact collision, the air bag being part of an air bag module (23), the method including the step of folding the air bag (24) into a compact configuration such that when inflation gas is communicated into the air bag a resultant momentum vector, of the unfolding air bag sections, is directed forward of the seat and laterally away from a location of a seat, wherein the step of folding includes:
    a) manipulating a portion of the air bag to form an outwardly expandable first portion, b) folding or rolling another portion of the air bag, the another portion being located downstream from the first portion and moveable therewith, c) filling the air bag with inflation gas to cause the first portion and the another portion to initially move outwardly away relative to the seat and d) subsequently filling the another portion with gas to cause the another portion to inflate in a generally forward direction relative to the seat.

2. The method as defined in claim 1 wherein the first portion and each fold or roll made in the air bag is placed on a side of the air bag away from the location of the seated occupant.

3. The method as defined in claim 1 wherein the step of manipulating forms pleated section in the air bag which is relatively outwardly rotatable about a fold line.

4. A method of folding an air bag (24) to protect an occupant during a side impact collision, the air bag being part of an air bag module (23) usable within an outboard portion of a vehicle seat, the air bag (24) including a neck portion (52), of length, a, extending in a first direction and a cushion (50) having a first side (53a) that extends generally perpendicular to the first direction, a longer second side (53b) that is generally parallel to the first direction and a top side (53c), the method including the step of a)folding the air bag (24) into a compact configuration such that when inflation gas is communicated into the air bag a resultant momentum vector, of the unfolding air bag sections, is directed forward of the seat and laterally away from a location of a seated occupant;
    the method including the steps of:
        b) reducing the width of the first side by folding the air bag about a first fold line (80),
        c) reducing the length of the folded-over cushion (50) of step (a) by rolling the top edge into a first roll (90) and continuing to roll the first roll (90) toward side (53a) to a distance 2a from the first side (53,a),
        d) repositioning the roll (90) so that it lays upon the air bag material adjacent the neck portion (52) and is parallel to the first direction,
        e) rolling or folding the material extending beyond the first roll (90), opposite to the neck (52), closer to the first roll,
        f) enclosing the folded air bag with a tearable covering (116).

5. The method as defined in claim 4 wherein step 3(d) includes forming the extending material into a tapered form adjacent the first roll (90) and wherein step 3(e) includes covering the air bag with a covering (116) having a complementary tapered shape.

6. The method as defined in claim 4 including the step of inserting an inflator (60) into the air bag.

7. The method as defined in claim 4 wherein step 3(d) includes forming the extending material into a second roll (112) and positioning the second roll adjacent the first roll (90).

8. An air bag (24) adapted to be inflated to protect an occupant during a side impact collision, the air bag installed within a vehicle seat, the air bag including first means for controlling the inflation dynamics of the air bag such that when inflation gas is communicated to the air bag a resultant momentum vector, of unfolding air bag sections, is directed forward of the seat and laterally away from the seat, the first means including an outwardly movable first portion and another portion initially moveable with the first portion, the first portion, movable from a non-inflated installed position to an inflated position, wherein in the inflated position the first portion is moved generally away from the installed position within the seat, the another portion being movable to an inflated position subsequent to the movement of the first portion, the another portion inflating generally forward of the installed position within the seat.

9. The air bag as defined in claim 8 wherein each first portion, fold or roll made in the air bag is placed on a side of the air bag away from the location of the seated occupant.

10. The air bag as defined in claim 8 wherein the first portion includes a pleat having a folded over portion formed at an angle to permit the desired movement thereof.

11. An air bag (24) adapted to be inflated to protect an occupant during a side impact collision, the air bag installed within a vehicle seat, the air bag including first means allowing it to be folded into a compact configuration for controlling the inflation dynamics of the air bag such that when inflation gas is communicated to the air bag a resultant momentum vector, of unfolding air bag sections, is directed forward of the seat and laterally away from a location of a seated occupant, wherein each fold or roll made in the air bag is placed on a side of the air bay away from the location of the seated occupant;
    including at least a first rolled portion adjacent a tapered portion.

12. The air bag of claim 11 including an open sided housing which tapers from a first end to a second end and wherein the air bag is situated within the housing.

13. An air bag (24) adapted to be inflated to protect an occupant during a side impact collision, the air bag installed within a vehicle seat, the air bag including first means allowing it to be folded into a compact configuration for controlling the inflation dynamics of the air bag such that when inflation gas is communicated to the air bag a resultant momentum vector, of unfolding air bag sections, is directed forward of the seat and laterally away from a location of a seated occupant, wherein each fold or roll made in the air bag is placed on a side of the air bag away from the location of the seated occupant;

a cover having a complementary tapered shape covering the rolled portion and the tapered portion.

* * * * *